3,117,108
PROCESS FOR PRODUCING METHACRYLATE/N-METHYLOLACRYLAMIDE POLYMERS
Louis Gerald Calvete, Welwyn Garden City, England, assignor to Imperial Chemical Industries Limited, London, England, a corporation of Great Britain
No Drawing. Filed Nov. 10, 1959, Ser. No. 851,959
Claims priority, application Great Britain Nov. 28, 1958
4 Claims. (Cl. 260—80.5)

This invention relates to improvements in polymers of methyl methacrylate.

In the past a number of methods have been proposed for the production of methyl methacrylate polymers having improved resistance to organic liquids and a reduced tendency to distort or lose their shape when heated. In a number of these methods it has been proposed to copolymerise methyl methacrylate with a compound containing two polymerisable double bonds e.g. ethylene glycol dimethacrylate. The use of such compounds leads, however, to certain disadvantages. In particular the copolymers obtained are considerably less thermoplastic than polymethyl methacrylate and it has been difficult, if not impossible, to shape them at elevated temperatures. A further disadvantage arises from the fact that during the copolymerisation of methyl methacrylate with such compounds the rate at which the mixture hardens is not uniform throughout its volume. Consequently, the contraction of the mixture which takes place during polymerisation does not proceed uniformly and the solid polymer obtained does not reproduce faithfully the configuration of surfaces, e.g. the walls of a mould, by which it is confined during polymerisation.

It is an object of the present invention to provide compositions containing methyl methacrylate which on polymerisation yield solid polymers that can be shaped at elevated temperatures and that can be converted by a heat-treatment into products that are more resistant to organic liquids than the known homopolymers of methyl methacrylate. A further object is to provide such compositions having the additional characteristic that solid polymers prepared from them can be converted by heat-treatment into products that have a reduced tendency to distort or lose their shape under the influence of heat.

According to the present invention, we provide a composition which contains methyl methacrylate with or without a lesser amount by weight of an ester of acrylic acid with a saturated monohydric alcohol containing not more than eight carbon atoms per molecule, and to each molar proportion of said methyl methacrylate and of said ester of acrylic acid if present, from 0.005 to 0.50 molar proportions of a substitution product of acrylamide or methacrylamide in which one of the hydrogen atoms attached to the nitrogen atom has been substituted by a methylol group or by an alkoxy substituted methyl group in which the alkoxy group contains not more than 8 carbon atoms, and from 0 to 0.25 molar proportions of acrylamide, methacrylamide or a mono-N-substituted acrylamide or methacrylamide in which the substituting group is not a methylol group or alkoxy substituted methyl group, the composition being substantially free of any compound containing two or more polymerisable double bonds. We prefer that the composition should contain not more than 0.001 molar proportions of any compound containing two or more polymerisable double bonds to each molar proportion of methyl methacrylate and of said ester of acrylic acid if present.

Also according to our invention we provide a process for producing such a composition in which methyl methacrylate, with or without a lesser amount by weight of said ester of acrylic acid, is mixed together with acrylamide or methacrylamide and formaldehyde in concentrations sufficient to form said methylol substituted compound in said proportions of from 0.005 to 0.50 molar proportions of said methylol substituted compound to each molar proportion of methyl methacrylate and of said ester of acrylic acid if present, and the mixture is heated.

The polymers obtained by polymerising compositions according to this invention are thermoplastic and can readily be shaped at elevated temperatures. On subjecting these polymers to a heat treatment their resistance to organic solvents increases and their tendency to distort or lose their shape at elevated temperatures simultaneously decreases. The extent of the improvement in these respects increases as the proportion of the methylol or alkoxy methyl substituted amide present is increased. The polymers obtained from compositions in which the proportion of the methylol or alkoxy methyl substituted amide is high e.g. in excess of 0.10 molar proportions, in relation to the proportion of methyl methacrylate are substantially thermosetting and cannot be moulded after heat-treatment. Such polymers should therefore be subjected to any desired shaping operation before they are heat-treated. Polymers prepared from mixtures containing relatively low proportions of the methylol or alkoxy methyl substituted amide on the other hand, e.g. not more than 0.05 molar proportions can still be shaped at elevated temperatures after heat-treatment.

Mono-N-methylol methacrylamide is the preferred methylol substituted amide for use in compositions according to this invention as the polymers then obtained show particularly high resistance to organic liquids and high heat distortion and demoulding temperatures after heat-treatment. Particularly good results are achieved when mono-N-methylol methacrylamide is used in conjunction with methacrylamide.

Examples of mono-N-substituted amides that may be used in conjunction with the methylol or alkoxy methyl substituted amide in compositions according to this invention include N-methyl acrylamide and N-methyl methacrylamide.

The esters of acrylic acid that may be included are for example ethyl acrylate, butyl acrylate and ethyl hexyl acrylate. The reason for including these copolymerising monomers is to make the copolymer more easily deformed when heat softened in the shaping operation. The amounts normally required are from 0% to 15% by weight of the mixture of methyl methacrylate and the ester of acrylic acid.

The compositions of this invention preferably contain no compound containing two or more polymerisable double bonds in order to avoid the undesirable effects of such compounds described hereinbefore.

The compositions of this invention may be produced by mixing pre-formed ingredients or alternatively in the case of the methylol substituted amide, the compound may be prepared in situ by heating the corresponding amide with sufficient formaldehyde to form the methylol derivative in the presence of all or a part of the methyl methacrylate and thereafter adding any required additional methyl methacrylate. If the methylol substituted amide is made in situ, the amide or the formaldehyde or both may if desired be added to the methyl methacrylate in portions or continuously. The formaldehyde may conveniently be used in the form of an aqueous solution, e.g. as formalin, and the reactants may be heated together under reflux at atmospheric pressure. Suitable periods of heating are of the order of 1 to 30 minutes. The water present may then be separated by distillation; if the concentration of water present is not large it may not be necessary to remove it and the mixture can be heated until a syrup is formed and polymerisation effected as hereinafter described. If the proportion of water present is large, separation may occur and for this reason its removal may be necessary. The presence of water may have a slightly adverse effect on the craze resistance and softening point of the final polymer, and for this reason it is in general preferred to remove the water before polymerisation. Instead of using formalin, gaseous formaldehyde may be passed into a stirred and heated mixture of the methyl methacrylate and the amide. Gaseous formaldehyde for this purpose may be obtained for example, by pyrolysing paraformaldehyde, $\alpha$-polyoxymethylene or a hemiformal, for example, cyclohexyl hemiformal. In order to obtain a final polymer with the most useful properties e.g. resistance to crazing, we prefer that to each molar proportion of acrylamide or methacrylamide, there should be less than one molar proportion of formaldehyde. In particular, we prefer that to each molar proportion of acrylamide or methacrylamide there should be from 0.25 to 0.75 of one molar proportion of formaldehyde.

The compositions of this invention may be polymerised by any desired method. Since they contract in volume as they polymerise, it is necessary when polymerising them in a mould, to use a mould of the type in which the walls of the mould are capable of moving in such a way as to maintain contact with the composition as it contracts. A convenient form of mould for the production of flat sheets consists of two parallel sheets of glass separated at their peripheries by a resilient gasket. Before compositions according to the present invention are introduced into a mould of this type, they are preferably heated to about 100° C. in the absence of a polymerisation catalyst, or in the presence of a very small concentration of catalyst e.g. approximately 0.001 to 0.005% of benzoyl peroxide based on the weight of the polymerisable constituents of the composition, until their consistency thickens to that of a syrup. This facilitates the introduction of the composition into the mould and also reduces the danger of the composition seeping between the gasket and the glass walls of the mould. When converting the composition to a syrup we prefer to maintain the composition in alkaline condition preferably at pH 8 to 9 because under these conditions the syrup is kept in a condition in which it can be easily handled. The pH can be controlled by the addition of alkali.

The conversion of compositions according to this invention to solid polymers is preferably effected by heating them in the presence of a free radical yielding polymerisation catalyst. Any catalyst suitable for polymerising methyl methacrylate may be used for this purpose. Suitable catalysts thus include organic peroxides, e.g. benzoyl peroxide, lauryl peroxide and the azo catalysts in which the valencies of the azo group are attached to different non aromatic, preferably tertiary, carbon atoms, e.g. $\alpha,\alpha'$-azo-bis-isobutyronitrile.

The heat-treatment to which the resulting polymer is subjected in order to develop its resistance to organic liquids and heat may be carried out either before or after the polymer is removed from the mould. If the polymer is substantially thermosetting in character, however, and it is desired to subject it to a shaping operation after removing it from the mould, then the heat treatment must of course be deferred until after the shaping operation.

Temperatures between about 90° C. and the degradation temperature of the polymer are suitable for the heat-treatment of the polymer. It is preferred to use a temperature below about 185° C. in order to avoid the risk of degradation of the polymer. On the other hand, the period of heating required decreases as the temperature increases and it is therefore preferred not to use temperatures below about 150° C. Within the temperature range of 150° C. to 185° C., periods of heating of the order of 10 to 150 minutes are usually adequate.

The duration of the heat-treatment may be reduced by including in the compositions of this invention a small proportion of an aliphatic acid that is soluble in the composition e.g. methacrylic acid. This, if used, is preferably added to the composition after it has been converted into a syrup and before its conversion into a solid polymer. Suitable proportions of methacrylic acid are of the order of 0.1 to 6% by weight of the methyl methacrylate originally present in the composition. Examples of other suitable acids are acrylic acid and maleic acid.

The heat-treated polymers produced from compositions according to this invention which are still capable of being shaped are particularly suitable for such applications as aircraft canopies and windows, watch glasses and buttons which may come into contact with solvents e.g. during dry-cleaning. The substantially thermoset polymers are particularly suitable for applications in which dimensional stability at high temperatures is desired e.g. for the production of lighting fittings.

The polymers produced from the compositions of this invention are in general also suitable for other applications of the type for which polymethyl methacrylate has hitherto been used. They are of course particularly suitable for use in applications involving contact with organic liquids because of their high degree of resistance to attack and crazing by such liquids.

Ancillary ingredients e.g. colouring materials, pigments, stabilisers or plasticisers e.g. dibutyl phthalate, may be added to the composition at any convenient stage.

Our invention is illustrated but not limited by the following examples in which all parts are by weight.

*Example 1*

To 100 parts of methyl methacrylate were added 5.6 parts of methylacrylamide and 4 parts of formalin. The mixture was heated to 80° C. at atmospheric pressure under reflux for 10 minutes. Water was then separated from the mixture by distillation, the water distilling in the form of an azeotropic mixture with methyl methacrylate. The temperature of the mixture was raised to 100° C. and maintained at this level until the mixture thickened to a syrupy consistency. After cooling, benzoyl peroxide and methacrylic acid were added to the mixture in proportions of 0.1 part and 1 part, respectively, per 100 parts of the mixture. The mixture was poured into a flat casting mould having movable glass walls and polymerized to a solid sheet by subjecting it to a temperature of 56° C. for a period of 8 hours and then to a temperature of 100° C. for a further 3 hours. The sheet was then removed from the mould and heat-treated by suspending it in an oven at a temperature of 180° C. for 2 hours.

On immersing a piece of the resulting transparent sheet in chloroform at 18° C. it did not swell beyond a weight increase of 250%. Under the same conditions a sample of commercially available polymethyl methacrylate sheet dissolved completely.

*Example 2*

210 parts of methacrylamide and 37.8 parts of formalin with a pH of 8.5, were added to 450 parts of methyl methacrylate monomer. The mixture was warmed until a clear homogeneous solution was obtained, and the solution was then heated to 83° C. to remove the water-methyl methacrylate azeotrope. On removing the water, the solution had thickened sufficiently to make it suitable for pouring into a glass-cell, although it was still free-flowing. 0.7 parts of benzoyl peroxide were added and sufficient methyl methacrylate monomer to make the total weight 700 parts. The solution was placed in a cell made of two glasses separated by a distance of 0.160″ by a resilient gasket round the periphery of the glass plates, and polymerised at a gradually increasing temperature from 50°–100° C. On curing the sheet at 160° C. a cross-linked sheet was obtained which increased less than 1% by weight when placed in chloroform for 36 hours. Commercial polymethyl methacrylate dissolved under these conditions.

*Example 3*

To 100 parts of methyl methacrylate were added 0.002 parts of benzoyl peroxide and 10 parts of methacrylamide. The mixture was warmed to dissolve the methacrylamide, after which 2.7 parts of formalin (containing 36% of formaldehyde on a weight basis) were added. The mixture was then filtered, and then heated to 80° C. until a syrup was formed. The syrup was cooled and to it were added 0.1 parts of benzoyl peroxide.

The syrup was placed in a glass cell as described in Example 2 and polymerised at a gradually increasing temperature from 50 to 100° C. The polymerised sheet was removed from the cell and then maintained at 160° C. for 20 minutes. The final polymer was insoluble in organic solvents.

I claim:
1. A process for the production of solid polymeric material by bulk polymerization of a polymerizable composition comprising heating said composition in the presence of a catalytic amount of a free radical yielding polymerization catalyst until a solid polymeric sheet is formed,
said polymerizable composition consisting essentially of (a) a monoethylenically unsaturated monomeric ester material selected from the class consisting of methyl methacrylate and mixtures of methyl methacrylate with up to 15% of an ester of acrylic acid with a saturated monohydric alcohol containing not more than eight carbon atoms per molecule, and (b) from .005 to 0.50 molar proportions of said monomeric ester material of a substituted amide having the formula

$$CH_2{=}CR.CO.NH.CH_2.OR_1$$

where R is selected from the group consisting of H and $CH_3$ and $R_1$ is selected from the group consisting of H and alkyl radicals containing not more than 8 carbon atoms,
and thereafter heating said polymeric material to a temperature within the range 150° C. to 185° C. to increase resistance to solvents and deformation under the influence of heat.

2. A process according to claim 1 in which said substituted amide is mono-N-methylol methacryalmide and in which the proportion of said substituted amide is from 0.10 to 0.50 molar proportions to each molar proportion of said monomeric ester material.

3. A process according to claim 1 in which said substituted amide is mono-N-methylolmethacrylamide and in which the amount of said substituted amide is from 0.005 to 0.05 molar proportions to each molar proportion of said monomeric material.

4. A process for the production of a solid polymeric material by bulk polymerization of a polymerizable composition comprising heating said composition in the presence of a catalytic amount of a free radical polymerization catalyst until a solid polymer is formed,
said polymerizable composition consisting essentially of (a) a monoethylenically unsaturated ester material selected from the class consisting of methyl methacrylate and mixtures of methyl methacrylate with up to 15% of an ester of acrylic acid with a saturated monohydric alcohol containing up to eight carbon atoms per molecule, and (b) from 0.005 to 0.50 molar proportions of said monomeric ester material of a substituted amide having the formula $$CH_2{=}CR.CO.NH.CH_2OH$$

in which R is selected from the group consisting of H and $CH_3$, said substituted amine being the product obtained by heating a compound selected from the group consisting of acrylamide and methacrylamide with an aqueous solution of formaldehyde in sufficient quantity to form the methylol derivative, said heating being initially carried out under reflux and the water present thereafter being removed by distillation,
and thereafter heating said polymeric material to a temperature within the range 105° C. to 185° C. to increase resistance to solvents and deformation under the influence of heat.

References Cited in the file of this patent
UNITED STATES PATENTS

| 2,761,856 | Suen et al. | Sept. 4, 1956 |
| 2,794,016 | Glenn et al. | May 28, 1957 |
| 2,940,943 | Christenson et al. | June 14, 1960 |
| 3,018,265 | Tessmar | Jan. 23, 1962 |